(12) United States Patent
Petit et al.

(10) Patent No.: US 10,712,206 B2
(45) Date of Patent: Jul. 14, 2020

(54) BELT FOR MEASURING THE TEMPERATURE OF AN OBJECT

(71) Applicant: Electricite de France, Paris (FR)

(72) Inventors: Marc Petit, Pontoise (FR); Sylvain Blairon, Montesson (FR)

(73) Assignee: Electricite de France (FR)

( * ) Notice: Subject to any disclaimer, the term of this patent is extended or adjusted under 35 U.S.C. 154(b) by 307 days.

(21) Appl. No.: 15/760,706

(22) PCT Filed: Sep. 15, 2016

(86) PCT No.: PCT/EP2016/071789
§ 371 (c)(1),
(2) Date: Mar. 16, 2018

(87) PCT Pub. No.: WO2017/046223
PCT Pub. Date: Mar. 23, 2017

(65) Prior Publication Data
US 2018/0259395 A1    Sep. 13, 2018

(30) Foreign Application Priority Data
Sep. 18, 2015   (FR) ...................... 15 58826

(51) Int. Cl.
*G01K 1/14*    (2006.01)
*G01K 1/02*    (2006.01)
(Continued)

(52) U.S. Cl.
CPC ............. *G01K 1/026* (2013.01); *G01K 1/143* (2013.01); *G01K 1/146* (2013.01); *G01K 7/02* (2013.01); *G21C 17/112* (2013.01)

(58) Field of Classification Search
CPC .......... G10K 13/002; G10K 1/16; G10K 1/14; G10K 1/143; G03G 2215/2032;
(Continued)

(56) References Cited

U.S. PATENT DOCUMENTS 1,978,089 A * 10/1934 Jones .................. A47J 36/2466
                                                            219/432
2,649,527 A *  8/1953 Chapman ............... B23K 13/06
                                                            219/611
(Continued)

FOREIGN PATENT DOCUMENTS

DE          102009003848 A1    11/2010

OTHER PUBLICATIONS

International Search Report for PCT/EP2016/071789 dated Nov. 17, 2016.
(Continued)

*Primary Examiner* — Gail Kaplan Verbitsky
(74) *Attorney, Agent, or Firm* — Lerner, David, Littenberg, Krumholz & Mentlik, LLP

(57) ABSTRACT

The invention concerns a belt for measuring temperature of an object, the belt comprising: at least one measurement sensor, a strip having a circumference intended to surround the object, a device for clamping the strip around the object, characterized in that the temperature sensor is mounted on an individual heat-insulating support displaceable in a guiding direction toward the object between at least two heat-insulating pads which are intended to abut against the object, the pads being attached to the strip.

14 Claims, 5 Drawing Sheets

Figure 1:
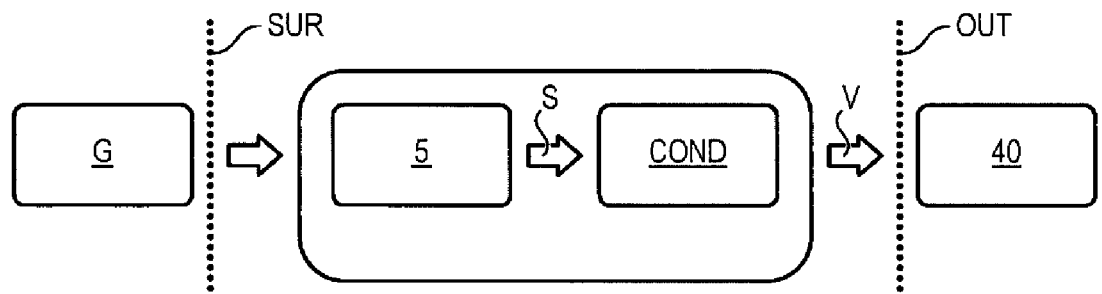

(51) Int. Cl.
*G21C 17/112* (2006.01)
*G01K 7/02* (2006.01)

(58) Field of Classification Search
CPC ....... G03G 2215/2016; G03G 15/2053; G03G 15/206; G01K 1/14; G01K 11/32064
USPC ................. 374/208, 179, 141, 137, 110, 112
See application file for complete search history.

(56) References Cited

U.S. PATENT DOCUMENTS

| | | | | |
|---|---|---|---|---|
| 2,798,293 | A * | 7/1957 | Brodsky | ................. A01J 23/00 99/484 |
| 4,553,432 | A | 11/1985 | Barlian et al. | |
| 7,349,883 | B2 * | 3/2008 | Bjelogrlic | .......... G06Q 30/0283 705/37 |
| 8,511,892 | B2 * | 8/2013 | Koch | ................... A61B 5/6831 374/120 |
| 10,458,855 | B2 * | 10/2019 | Blundell | ................. G01J 5/046 |
| 2014/0334517 | A1 | 11/2014 | Blundell et al. | |

OTHER PUBLICATIONS

French Preliminary Search Report for FR 1558826 dated May 6, 2016.

* cited by examiner

BELT FOR MEASURING THE TEMPERATURE OF AN OBJECT

CROSS REFERENCE TO RELATED APPLICATIONS

The present application is a national phase entry under 35 U.S.C. § 371 of International Application No. PCT/EP2016/071789 filed Sep. 15, 2016, published French, which claims priority from French Patent Application No. 1558826 filed Sep. 18, 2015, all of which are incorporated herein by reference.

The invention relates to a belt for measuring the temperature of an object.

One field of application of the invention relates in particular to water pipes such as for example those of the primary circuit of nuclear power plants.

Known from document U.S. Pat. No. 4,553,432 is a belt for measuring the temperature, used to measure the temperature and the humidity around steam pipes, so as to detect leakage there, or in a drain of a nuclear power plant to detect that the water falling into this drain comes from a leak, so as to be used as a surveillance system for it.

This known measurement belt has in particular the disadvantage that the temperature measurement cable is covered with a heat-insulating strip which prevents it from being directly in contact with the object to be measured. Thus, the measurement supplied by this known belt can be suitable in a leak surveillance system but have poor accuracy as to the value of the temperature.

The invention aims to improve the belt for measuring temperature to have a better measurement accuracy.

In particular, the invention must be able to be used in certain constraining environments, such for example as those having reduced space, high temperature, ionizing radiation, such as for example on water pipes of pressurized-water reactors (abbreviated PWRs) of electricity production power plants.

These environments are subjected to supplementary qualification requirements of the measurement belt, which can for example be resistance to earthquakes, resistance to pressure, resistance to high temperatures, resistance to humidity, resistance to high mechanical stresses.

In addition, in the case of an environment subjected to ionizing radiation, as for example for a water pipe of a pressurized-water nuclear reactors, the persons who must install the measurement belt on the pipe are exposed to this radiation. It follows not only that the staff must intervene very rapidly to minimize the quantity of radiation received during the intervention but must also have a measurement belt that is reliable, systematic and able to adapt to any type of object on which it must be installed.

Thus, the temperature measurement belt must for example be able to be installed on an object which may have a mean temperature of 300° C. in the case of a pipe of an electricity production power plant in operation, and 70° C. when stopped.

In the case of a water pipe of a nuclear reactor of an electricity production power plant, subjected to ionizing radiation, the irradiation in the assembly zone of the belt can attain 5 kGy/year (or 100000 Gy in 20 years) at full power.

Thus, these environments must not be penalizing factors on the assembly time and on the good positioning of the attachment belt on the object.

In the case of a water pipe of a nuclear reactor of an electricity production power plant, thermocouples placed directly in contact with the zone to be studied to measure temperature are known.

Thermocouples being directly welded to piping are known, creating surface stress zones. At the conclusion of instrumentation, it was necessary to grind the surface on the thickness impacted by the stress zone so as to avoid any risk of later cracking. This solution can respond partially to the problem of dynamic behavior but is shown to be very penalizing in terms of dosimetry because the time required for installation and proper positioning of the sensor and the reconditioning of the piping at the conclusion of the measurement campaign is high. But much of the piping is not accessible to this type of implementation. In the case of thermal fatigue measurement, a large number of sensors (8 to 20 for sections of 2 to 16 inches) must be placed according to a predefined distribution depending on the phenomena expected on the same circumference of the piping. The layout, and even more the welding in place of each sensor individually on the piping is difficult and sometimes even impossible due to the presence of supports and obstacles not allowing a welder to operate in a reasonable time. This problem returns during the removal of the instrumentation, during which it is necessary to manage the effluents due to the grinding of the piping. This type of instrumentation is accompanied by a very complex technical file and administrative authorizations that are difficult to obtain.

In addition, the implementation of systems for positioning and attachment sensors grouped within the same device to the piping generally has problems of heat conduction between sensors and piping and of common modes between sensors.

Thus, the invention aims to obtain a belt for measuring temperature of an object that mitigates the disadvantages of the prior art and responds to the requirements of these constraining environments and remains reliable in them by requiring a very short intervention time of the staff for assembling the belt to the object in these environments.

To this end, the invention provides a belt for measuring temperature of an object, the belt comprising:
  at least one measurement sensor,
  a strip having a circumference intended to surround the object,
  a device for clamping the strip around the object,
  characterized in that the temperature sensor is mounted on an individual heat-insulating support, displaceable in a guiding direction toward the object between at least two heat-insulating pads which are intended to abut against the object from a first high position, in which the sensor is at a non-zero distance from the object along the guiding direction, to a second low position, in which the sensor is applied against the object, the pads being attached to the strip.

Thanks to the invention, the temperature sensor is applied directly against the object while still having good accuracy in measuring the temperature by this sensor, while freeing itself from perturbations external to the object on which the belt is installed, Thanks to the invention, it is possible to immobilize the temperature sensor with rapidity and reliability against the object in environments constraining to the staff. Thus, the direct assembly of the temperature sensor against the object can be systematized with great rapidity in constraining environments such as those mentioned above and requiring great rapidity of intervention by the staff, while still obtaining good accuracy in measurement.

According to one embodiment of the invention, a plurality of temperature sensors distributed along the circumference of the strip is provided as a temperature sensor, the plurality of temperature sensors being associated with a plurality of individual heat-insulating supports of these temperature sensors, the supports each being guided in a guiding direction toward the object between heat-insulating pads attached to the strip.

According to one embodiment of the invention, for an object with a curved and convex outer surface, which has to be surrounded by the circumference of the strip, the guiding direction is radial.

According to one embodiment of the invention, the support is constrained to move along the guiding direction toward the object by a constraining device mounted between the support and the strip.

According to one embodiment of the invention, the temperature sensor comprises a portion for application against the object, disposed on an inner surface of the support, intended to be turned toward the object.

According to one embodiment of the invention, the pads are attached to an inner surface of the strip.

According to one embodiment of the invention, the belt comprises a device for lifting the support, wherein the device for lifting the support is capable of occupying the first high position and is capable of passing to the second low position, the support being constrained to move along the guiding direction toward the object from the first position to the second position by a constraining device mounted between the support and the strip, the lifting device being actuable from the outside to cause the sensor to pass from the first position to the second position.

According to one embodiment of the invention, the lifting device of the support comprises an upper plate, attached to the support by at least one rod passing through the strip, the plate being outside the strip.

According to one embodiment of the invention, the lifting device of the support comprises a holding member to hold the support in the first high position, wherein the holding member is removably attached to the upper plate to allow, when the holding member is removed from the plate, to cause the sensor to pass from the first high position to the second low position.

According to one embodiment of the invention, the constraining device comprises at least one spring mounted between the support and the strip to constrain the support to move in the guiding direction toward the object.

According to one embodiment of the invention, the holding members associated respectively with the individual supports can be mutually integral.

According to one embodiment of the invention, the holding member comprises a wire, which passes in a guide attached to the plate to hold the support in the first high position and which comprises at least one gripping section situated outside the plate to allow the wire to be removed from the guide to cause the sensor to pass from the first high position to the second low position.

According to one embodiment of the invention, the guide comprises at least two pulleys, which are rotatably mounted with respect to the plate and between which the wire is guided.

According to one embodiment of the invention, the temperature sensor comprises a thermocouple.

Figure 2:
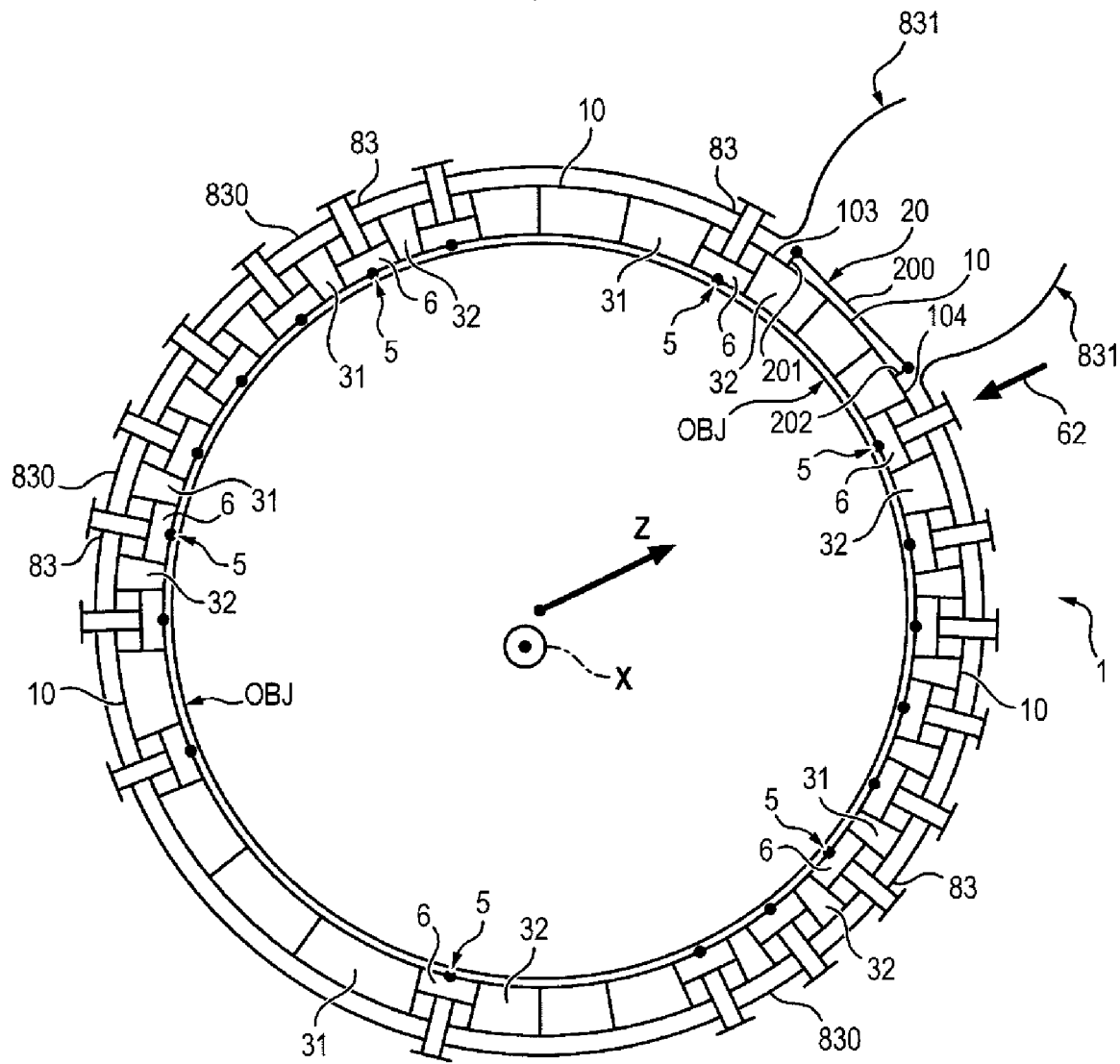
Figure 3:
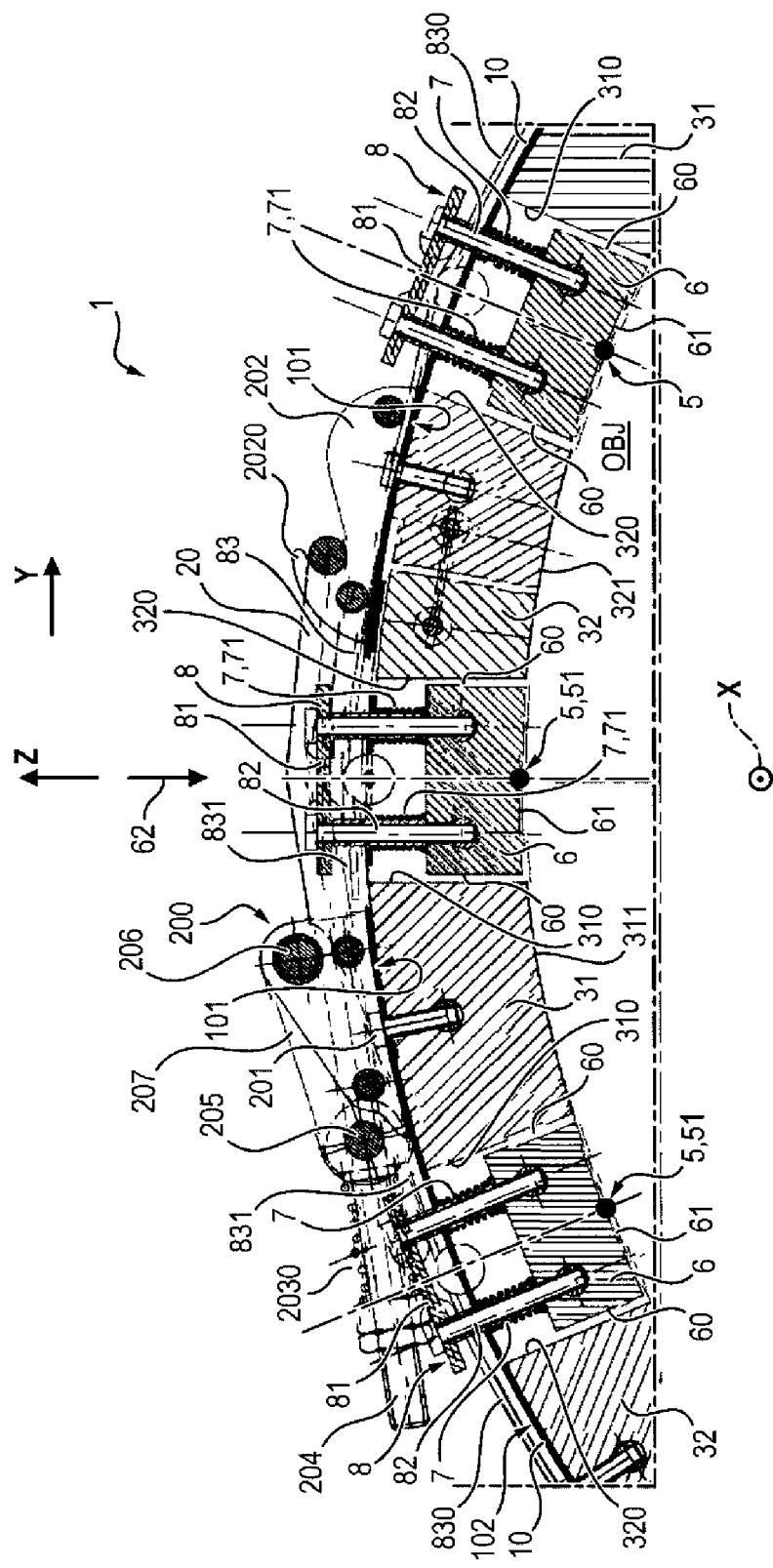
Figure 4:
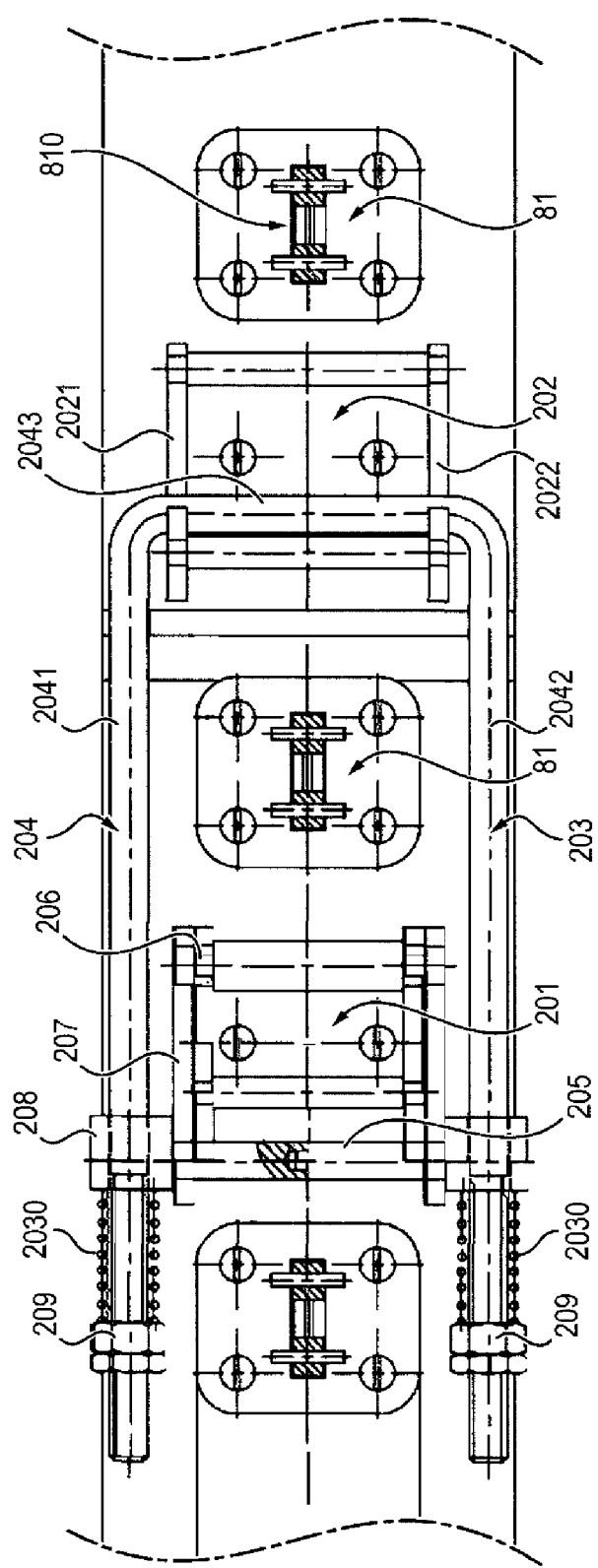
Figure 5:
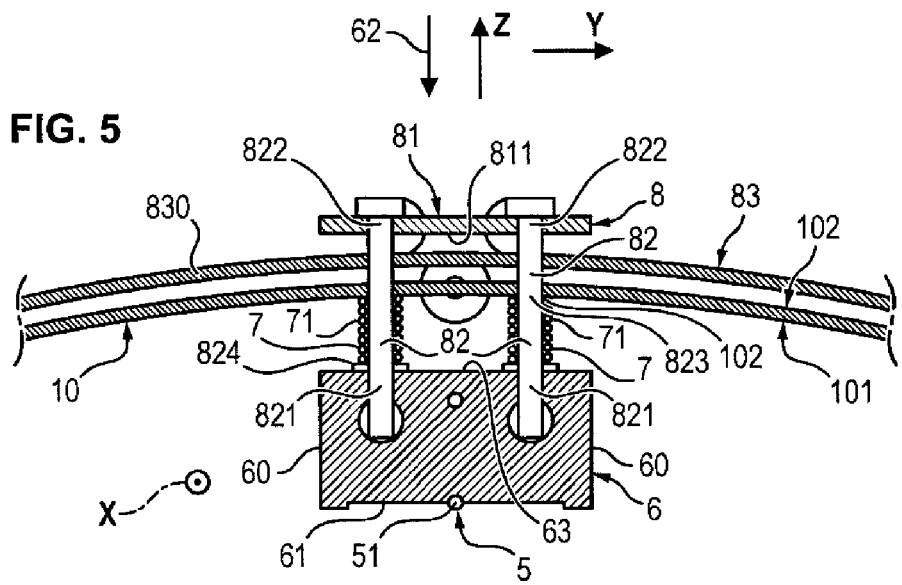
Figure 6:
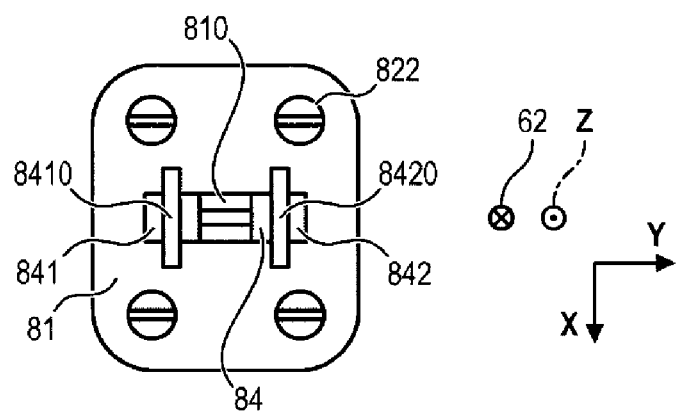
Figure 7:
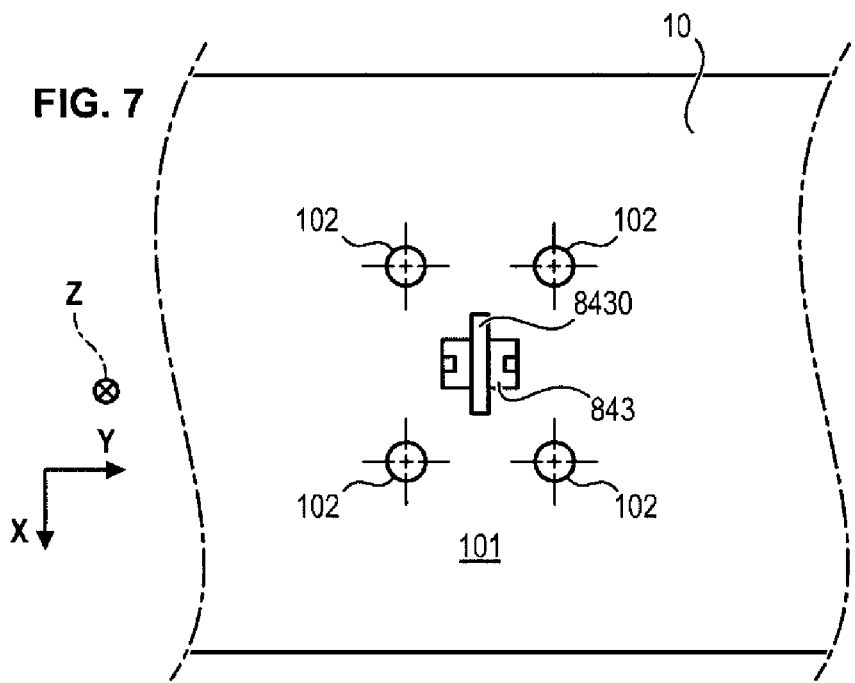
Figure 8:
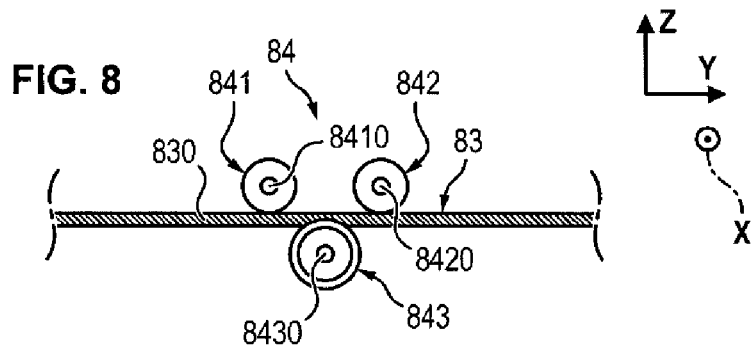
Figure 9:
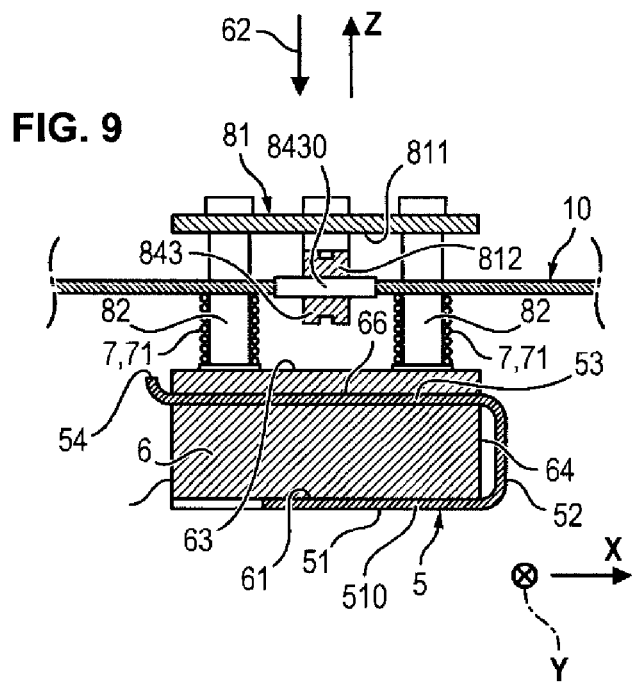
Figure 10:
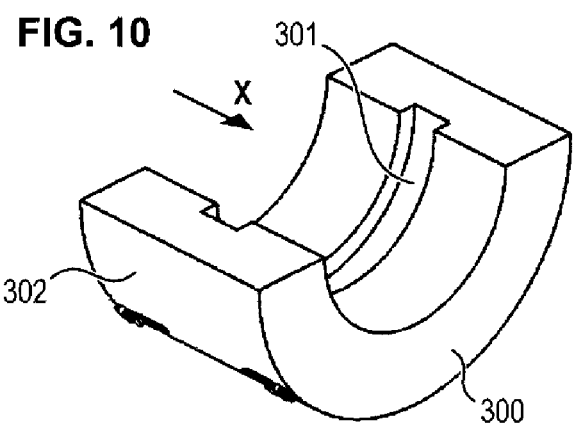

The invention will be better understood from reading the description that follows, given solely by way of a non-limiting example with reference to the appended drawings, in which:

FIG. 1 is a schematic of an instrumentation chain in which the measurement belt according to the invention can be used, FIG. 2 is a schematic view in a transverse plane of the measurement belt when it is installed around an object, according to one embodiment of the invention, FIG. 3 is a schematic view in a transverse plane of a portion of the measurement belt of FIG. 2, according to one embodiment of the invention, FIG. 4 is a top view of a portion of the measurement belt according to FIGS. 2 and 3, FIG. 5 is a schematic view in a transverse plane of a support of the temperature sensor of the belt, according to one embodiment of the invention, FIG. 6 is a top view of a plate of the support of FIG. 5, according to one embodiment of the invention, FIG. 7 is a bottom view of a portion of a strip of the measurement belt, according to one embodiment of the invention, FIG. 8 is a view in a transverse plane of a portion of the support of FIGS. 5 and 6, according to one embodiment of the invention, FIG. 9 is a schematic view of the support of FIG. 5, according to one embodiment of the invention, FIG. 10 is a schematic view of a heat-insulated module which can be provided for the measurement belt according to one embodiment of the invention.

In the figures, the measurement belt 1 according to the invention is used to attach at least one sensor 5 against an object OBJ. This object OBJ can for example be a fluid pipe OBJ, such as for example a water pipe, as is described below. One case of application of the invention is a belt 1 for mechanical attachment of one or more sensor(s) 5 on a liquid or gas pipe as the object OBJ. The object OBJ is for example a water pipe of the primary circuit of a pressurized-water nuclear reactor (PWR) of an electricity production power plant. The water pipe can be high-pressure piping. The belt comprises one or more temperature sensors 5. Of course, the belt 1 can additionally comprise one or more sensors other than temperature sensors 5 or comprise only one or more temperature sensors 5.

The belt 1 comprises a strip 10 having a circumference intended to surround the object OBJ, such as for example the pipe.

In the figures, the object OBJ extends in an axial direction X, around which the belt 1 must be disposed. Consequently, the strip 10 of the belt 1 surrounds the object OBJ in a plane transverse to the direction X, this transverse plane being formed by the directions Z and Y, mutually perpendicular and perpendicular to the direction X. The direction Z originates from the axis X of the object OBJ to pass through the object OBJ toward the belt intended to surround the object OBJ around this axis X. The direction Y is the direction tangent to the circumference of the strip around the object OBJ and around the axis X. The strip 10 is for example a strip made of metal.

The object OBJ or the pipe OBJ has for example an outer cylindrical contour, for example circular. For example, in the case of a circular cylindrical object OBJ around the axis X, the direction Z is the radial centrifugal direction, starting with the object OBJ, from the inside to the outside with respect to the belt 1. The object OBJ or the pipe OBJ can have a metallic outer surface, for example made of steel, against which the belt 1 is disposed. Of course, the invention can apply to any type of object, particularly cylindrical around the direction X which must be surrounded by the belt 1, which can be other than those mentioned above such as for example thermodynamic systems, agri-food, petrochemistry, methanation units.

The belt 1 comprises at least one temperature sensor 5. For example, in FIG. 1, a plurality of temperature sensors 5 is provided on the belt 1. The temperature sensor 5 or each of the temperature sensors 5 comprises for example a thermocouple.

The measurement belt 1 further comprises a device 20 for clamping the strip around the object OBJ. The clamping device 20 allows for example fastening the strip 10 around the object OBJ.

According to one embodiment, the temperature sensor 5 is a part of a measurement chain. FIG. 1 represents these elements as well as the interfaces between the measurement chain and the outer elements. A first interface is for example formed by the outer surface SUR of the object OBJ, against which the sensor 5 must be attached by the belt 1. The temperature sensor 5 serves to transform the physical quantity G or measurand G into an exploitable (often electric) signal S. The conditioner COND converts the quantity S at the output of the sensor 5 into a voltage whose amplitude or frequency reflects the temporal evolution of the physical quantity G. The first interface SUR constitutes the border between the physical process and the information desired. The capacity of the sensor 5 to measure the temperature can be penalized by elements belonging to the environment (corrosion, geometric irregularities, humidity, etc.) and particularly for sensors in direct contact.

In certain applications (ex. measurements by fastening on piping) there exists another indispensable element for proper operation of the instrumentation chain. This is the mechanical attachment system 1 of the sensor 5 which has as its main role to support and hold the sensor 5 in contact with the component which it is desired to measure, most often piping, allowing the chain to continue to provide the function expected: measurement of the physical quantity. To guarantee the proper operation of the sensor 5, the attachment system 1 must also insulate it from any perturbation inherent in the process but not desirable for measurement (ex. vibration, thermal and mechanical constraints, etc.).

In the case of a pressurized-water reactor (PWR), a strict observance of the objectives of quality to be attained is indispensable. Such is the case in particular with mechanical equipment resisting pressure (primary, secondary and auxiliary circuits) for which the Design and Construction Rules (DCR-M for mechanical equipment) have been defined. For any mechanical equipment not subjected to the DCR, such as for example the system 1 for attaching the temperature sensor 5, a qualification process must be implemented to guarantee the metrological performance of the instrumentation chains (functional qualification). Regarding the mechanical attachment system 1, there does not exist any dedicated design and manufacturing standards, but qualification tests must verify their safety with respect to the component on which it will be installed.

During qualification, conditions such as resistance to earthquakes, pressure, temperature or humidity can be verified.

In addition to the conditions required during qualification, other particular conditions of the primary circuit of an PWR must be considered when such attachment systems 1 are installed there permanently:

A mean temperature of 300° C. in operation and less than 70° C. during a unit outage.

An irradiation of 5 kGy/year (or 100000 Gy in 20 years) at full power.

The first condition above has an impact on the selection of the material and on the design of the attachment system 1. The system 1 for attaching the sensor 5 must be designed to resist strong mechanical stresses while still holding its main function. As for the second condition, it plays in implicit role in the selection of the material but the main impact of the irradiation on the design of the system 1 for attaching the sensor 5 is the intervention time necessary for the installation of the attachment system 1, or for any maintenance operation of the sensor 5 or the attachment system 1 itself.

One application case of the invention is a mechanical attachment belt 1 of a temperature sensor 5 against a water pipe OBJ of the primary circuit of a nuclear pressurized-water reactor of an electricity production power plant.

According to the invention, the temperature sensor 5 is mounted on an individual heat-insulating support 6. The heat-insulating individual support 6 is guided along a guiding direction 62 toward the object OBJ, between at least two heat-insulating pads 31, 32 attached to the strip 10. The heat-insulating pads 31, 32 are used to abut against the object OBJ and comprise an inner surface 311, 321 for contact with the object OBJ. This inner surface 311, 321 can have a shape complementary to that of the object OBJ, for example circular cylindrical, with the same diameter as that of the circular cylindrical object OBJ.

According to one embodiment, the individual heat-insulating support 6 has a thermal conductivity lower than that of the strip 10 and/or than that of the object OBJ or than that of steel. According to one embodiment, the individual heat-insulating support 6 is made of a material having a thermal conductivity greater than or equal to 0.15 W/mK and less than or equal to 0.40 W/mK, for example, at 500° C. Thus, according to one embodiment, the individual heat-insulating support 6 can be made of compressed calcium silicate, for example the material MonoluX 500 (registered trademark) having a thermal conductivity of 0.20 W/mK at 500° C. In another embodiment, the individual heat-insulating support 6 can be made of a polymer resin material or others. According to one embodiment, the individual heat-insulating support 6 does not contain halogens, to be able to be appropriate to use in a nuclear environment (PWR or others) as mentioned above. According to one embodiment, the heat-insulating pad 31, 32 has a thermal conductivity less than that of the strip 10 and/or than that of the object OBJ or than that of steel. According to one embodiment, the heat-insulating pad 31, 32 is made of a material with a thermal conductivity greater than or equal to 0.15 W/mK and less than or equal to 0.40 W/mK for example, at 500° C. Thus, according to one embodiment, the heat-insulating pad 31, 32 can be made of compressed calcium silicate, for example of the material Monolux 500 having a thermal conductivity of 0.20 W/mK at 500° C. In another embodiment, the heat-insulating pad 31, 32 can be made of a polymer resin material or others. According to one embodiment, the material of the heat-insulating pad 31, 32 does not contain halogens to be able to be appropriate for use in a nuclear environment (PWR or others) as mentioned above.

In the case of several temperature sensors 5 distributed along the circumference of the strip 10, each of the temperature sensors 5 is mounted on its respective individual heat-insulating support 6. The heat-insulating supports 6 are each guided in their proper guiding direction 62 toward the object OBJ between the heat-insulating pads 31, 32 attached to the strip 10.

For example, for an object OBJ having a curved and convex outer surface, which must be surrounded by the circumference of the strip 10, the guiding direction 62 is radial. For example, in the case of a circular cylindrical object OBJ surrounded by the belt 1, the guiding direction 62 is directed in the centripetal way, in the opposite way to the direction Z.

According to one embodiment, a constraining device 7 is mounted between the support 6 and the strip 10 to constrain the support 6 to move in the guiding direction 62 toward the object OBJ.

The supports 6 and the temperature sensors 5 are thus guided concentrically toward the object OBJ.

For example, each pad 31, 32 comprises a lateral surface 310 or 320, situated facing a lateral surface 60 of the support 6. The surface 310 and/or 320 and/or the surface 60 is for example substantially radial. The support 6 being located between the guide surfaces 310 and 320.

In addition, according to one embodiment, the temperature sensor 5 comprises a portion 51 for application against the object OBJ. This portion 51 is disposed on an inner surface 61 of the support 6, intended to be turned toward the object OBJ.

According to one embodiment, the pads 6 are attached to an inner surface 101 of the strip 10.

According to one embodiment, a device 8 for lifting the support 6 in the opposite way to the guiding direction 62 toward the object is provided, to lift the support 6 so that, in a first high position, the sensor 5 does not touch the object OBJ, and the pads 31 and 32 touch the object OBJ.

Thus, according to one embodiment, the device 8 for lifting the support 6 is capable of occupying a first high position, in which the sensor 5 is at a non-zero distance from the object OBJ in the guiding direction 62. The lifting device 8 is capable of passing to a second low position, in which the sensor 5 is applied against the object OBJ. The lifting device 8 is actuable from the outside to make the sensor 5 pass from the first position to the second position, the constraining device 7 allowing the support 6, and therefore the sensor 5, to be constrained to lower itself in the guiding direction 62 toward the object OBJ from the first position to the second position.

The invention thus allows high levels of accuracy and very low response times to be guaranteed, thanks to the insulating support 6 through which the mechanical system 7 presses a temperature sensor 5 or thermocouple 5 into direct contact with the object OBJ, such as for example piping, to measure a temperature on the surface of this object OBJ. On the object OBJ are thus placed, at locations predefined according to the phenomena to be measured, the temperature sensor(s) 5 and an individual heat-insulated device 7 for exerting pressure guaranteeing satisfactory contact for each temperature sensor 5 with the object OBJ. The generic structure of the belt is specifically adapted to each available section diameter of the object OBJ or of the pipe OBJ, the range of applicability of the belt 1 possibly extending from 4 inches to several hundred inches. In the case of large diameters of the object OBJ, recourse to several sections of belt 1 connected together allows guaranteeing good holding of the belt 1 at all points of the circumference, the positioning pads 31, 32 of the belt 1 allowing the spacing provided between each section to be observed. The belt 1 has thus been designed for rapid installation (less than 2 minutes per belt) and can be used up to 500, 800, even 1000° C., depending on the heat-insulating material used in the support 6 and the pads 31, 32 and according to the nature of the thermocouples 5. The belt 1 can carry one or more temperature sensors 5, the density of sensors 5 possibly extending up to one temperature sensor every 40 mm approximately along the circumference of the strip 10.

The belt 1 takes into account constraints linked to the nuclear environment (ionizing radiation) as well as all the other constraints belonging to an industrial facility such as bulk, compatibility of materials, mechanical resistance of the system to earthquakes.

According to one embodiment, the device 8 for lifting the heat-insulating support 6 comprises an upper plate 81, attached to the support 6 by at least one rod 82 passing through a hole 102 of the strip 10. The plate 81 is outside the strip 10, i.e. above the strip in the orientation of the direction Z.

According to one embodiment, the constraining device 7 comprises one or more springs 71 mounted between the support 6 and the strip 10. The spring(s) 71 are for example a compression spring. The spring(s) constrain the support 6 to lower itself in the guiding direction 62 toward the object OBJ. For example, the spring 71 is a coil spring surrounding the rod 82. A washer 824 can be provided between the spring 71 and the upper surface 63. The rod 82 can be formed for example by a screw. The rod 82 comprises a first lower end portion 821 attached to an upper surface 63 of the support 6, for example by being screwed into this upper surface 63, a second upper end portion 822 attached to the plate 81 and an intermediate segment 823 extending between the lower end portion 821 and the upper end portion 822 and passing through the hole 102 of the strip 10. The upper surface 63 of the support 6 is at a distance from its lower surface 61, on which is located the portion 51 of the temperature sensor 5.

The temperature sensor 5, when it is formed by a thermocouple, can have a U-shape. When the temperature sensor 5 is formed by a thermocouple, the temperature sensor 5 comprises a first lower segment 510 extending in the axial direction X or having a component following the axial direction X, the lower segment 510 forming the portion 51 of application against the object OBJ. This lower segment 510 of the thermocouple is connected to a transverse segment 52 extending along and at a distance from a transverse surface 64 of the support 6 to be connected to an upper segment 53 situated at a distance from the lower surface 61 and passing through a cavity 66 of the support 6, extending from the transverse surface 64 to another transverse surface 65 of the support 6 to leave this surface 65 again. The segment 52 extends for example along the direction Z, directed away from the object OBJ. The transverse surfaces 64 and 65 are at a distance from one another and connected at their upper end to the upper surface 63, and at their lower end to the lower surface 61, the support 6 being able to be a parallelepiped.

The upper segment 53 is connected to an outer segment 54, which departs the transverse surface 65, which extends under the strip 10 and which extends beyond it to be accessible from the outside and to be able to be connected to a unit for external acquisition and processing of the measurements carried out by the sensor 5 (for example the conditioner COND and/or others).

The spring(s) 71 make it possible to exert a pressure designed to press the lower portion 510 of the thermocouple on the object OBJ so as to guarantee satisfactory contacting. The lower surface 61 can comprise a groove guaranteeing the positioning of the lower segment 510 of the thermocouple and avoiding the formation of air gaps.

According to one embodiment, the lifting device 8 of the support 6 comprises a member 83 for holding the support 6 in the first high position. The holding member 83 is attached removably to the upper plate 81. When the holding member 83 is removed from the plate 81, the constraining device 7 causes the support 6, and therefore the sensor 5, to pass from the first high position to the second low position.

According to one embodiment, the holding members 83 associated respectively with the individual supports 6 for the different temperature sensors 5, are mutually integral. In the embodiment shown in the figures, the holding member 83 is formed by a wire 830, for example a metal wire, which passes into a guide 84 attached to the plate 81 to hold the support 6 in the first high position. The wire 830 comprises one or two sections 831 situated outside the plate 81 to allow the wire 830 to be removed from the guide 84, in order to lower the sensor 5 from the first position to the second position. Thus, the section 831 is situated outside the strip 10 and is accessible from outside to be used as a gripping section so as to pull on the wire 830 to remove it. The wire 830 thus allows all the temperature sensors 5 to be made to pass from the first high position to the second low position by a single withdrawal action of this wire 830.

According to one embodiment, the guide 84 has one or more pulleys 841, 842 and 843. The guide 84 comprises for example at least two pulleys 841, 842 843 which are rotatably mounted with respect to the plate 83 and between which the wire 830 is guided. At least one first upper pulley 841 and/or 842 and at least one second lower pulley 843 are for example provided, the wire 830 being guided between the first pulley 841 and/or 842 on the one hand and the second pulley 843 on the other hand. The pulley 841 is rotatably mounted around a rotation axis 8410 extending for example along the axial direction X and attached to the plate 81, for example directly on, below or in it. The pulley 842 is rotatably mounted around a rotation axis 8420 extending for example along the axial direction X and attached to the plate 81, for example directly on, below or in it. The pulley 841 is at a distance from the pulley 842 in the tangential direction Y. The plate 81 can comprise an opening 810 allowing the passage of the pulley 841 and/or 842. The second pulley 843 is rotatably mounted around a second rotation axis 8430 situated at a distance from the lower surface 811 of the plate 81. The second pulley 8430 is located for example between the plate 81 and the support 6, the second rotation axis 8430 being attached to an arm 812 attached below the surface 811 of the plate. The axis 8430 extends for example along the axial direction X and is located between the axes 8410 and 8420 in the tangential direction Y.

The invention makes it possible to put into contact the temperature sensor 5 against the object OBJ during installation of the belt 1 around the latter, due to the fact that during this installation the support 6 of the sensor 5 is held in the second high position. Damaging the temperature sensor 5 by friction against the surface of the object OBJ is thus avoided. When the belt has been installed and immobilized by its clamping device 20 around the object OBJ, the holding member 83 is withdrawn, which makes the support 6 pass from the second high position to the first low position. The temperature sensor 5 is thus supported against the object OBJ, with no risk of lateral movement of the temperature sensor with respect to the object, thanks to the support 6 being guided in the direction 62.

The strip 10 is for example metallic and can be made of stainless steel sheet. The length of the strip 10 can be cut to be adapted to the circumference of the object OBJ or the pipe OBJ. The strip 10 is configured to tolerate variations in temperature (and therefore the mechanical stresses) belonging for example to high-pressure piping OBJ (for example the primary circuit of a pressurized-water reactor). The strip 10 comprises holes intended to attach pads 31, 32 against its lower surface 101. The heat-insulating pads 31, 32 are attached below the strip 10 and ensure the positioning of the belt 1 on the object OBJ and thermal insulation with respect to the object OBJ. The clamping device 20 is attached on the outer surface 102 of the strip 10.

According to one embodiment, the clamping device 20 comprises a mechanical assembly 203 for elastic attachment between at least two mechanical parts 201 and 202 attached respectively to two end portions 103 and 104 of the strip 10. In particular, the clamping device 20 can be of the type with hooking between the two parts 201 and 202.

The mechanical assembly 203 is for example of the toggle clamp type which can comprise one or more springs 2030, as is described below. The elasticity of the mechanical attachment assembly 203 ensures the positioning of the belt 1 on the object OBJ or the pipe OBJ over the entire dimensional range defined by the standards governing the supply of industrial piping and other boilermaking elements. The belt 1 is thus attached elastically on the object OBJ. The clamping device 20 ensures elastic holding on the object OBJ so as to resist differential dilations and to vibrations.

According to one embodiment, the mechanical assembly 203 of the clamping device 20 comprises for example a lever 204 hinged by a first hinge axis 205 to a connecting rod part 207, itself hinged by a second hinge axis 206 to the first part 201. The hinge axis 205 is mounted on a yoke 208 slidably mounted on the lever 204. The compression spring 2030 is provided between an abutment 209 attached to the lever 204 and the yoke 208. The abutment 209 can be formed by one or more nuts screwed onto a thread of the lever 204. The lever 204 is for example stirrup-shaped and comprises two parallel branches 2041 and 2042, connected to one another by a third hooking branch 2043 situated at the end of the branches 2041, 2042 at a distance from their end in proximity to which are located the abutments 209. The second part 202 comprises for example a second hooking member 2020 intended to cooperate with the first hooking member 2043 in a clamping position of the strip 10 around the object OBJ in the tangential direction Y. The hooking part 202 comprises for example two hooks 2021 and 2022 distant from one another in the axial direction X against which is trapped the part 2043 by extending between these hooks 2021 and 2022 in the clamping position of the belt 1. The portion of the hooking branch 2043 situated between the hooks 2021 and 2022 serves as a gripping handle of the lever 204. To loosen the lever 204, the user pulls on the part 2043 in the direction Y in the way bringing the abutment 209 closer to the yoke 208, which compresses the spring 2030 until it causes the hooking part 2043 to pass behind the hooking part 202. The user then lifts the lever 204 to cause it to make it rotate around its axis 205 to open the mechanical assembly 203 into a position for loosening the belt 1.

The temperature measurement belt according to the invention allows the simultaneous implementation of a large quantity of measurement points in a few minutes while still guaranteeing their geometric positioning. Manufactured for example for one diameter of piping, it can be positioned over the entire range of the standard governing dimensional tolerances. The positioning of the sensors 5, but also of the exit 54 of the cables of the temperature sensors 5 during manufacture allows, in application of the implementation procedure, a guarantee against any error in positioning and any ambiguity in benchmarking. The recommendations which are made there regarding packaging allow the risks of surface and radiological or chemical contamination to be limited.

The belt being light and attached elastically to the object 1, and each sensor 5 having an individual system 6 for applying pressure coupled to a heat insulator 31, 32, the belt 1 guarantees good contact between the sensor 5 and the object OBJ, independently of variations in temperature (causing dilation and therefore mechanical stresses), vibrations or clamping torque on the object OBJ. The belt 1 is safe with regard to the object OBJ and the facility in which this object OBJ is located.

The dismantling-reassembly of the belt 1 during maintenance shutdowns of facilities, for example during radiography operations in the case of a fluid pipe of an PWR, is rapid and the reconditioning of the lifting device 8 and of the constraining device 7 for contacting the supports 6 of the sensors 5 is easy and rapid.

The temperature sensor 5, individually contacting and heat-insulated by the individual supports 6, has an optimal response time and very good measurement accuracy without common mode effects.

According to one embodiment, the belt 1 can be covered by a heat-insulated mattress 300. The heat-insulated mattress 300 has an inner cutting 301 corresponding to the profile of the belt 1 (for example in nuclear application). The mattress 300 is for example made of material that is solid or holds its shape around the belt 1 and around the object OBJ. For example, the mattress 300 is formed of two half-cylinders 302 which are disposed on either side of the belt 1 installed on the object OBJ to surround them around the axial direction X.

The measurement belt 1, having a small thickness and having a heat insulator 31, 32 in contact with the object OBJ, can be used without increasing the exterior volume of the heat-insulated mattress 300.

The clamping device offers the advantage of being adaptable to a large range of object diameters and belt lengths and to all cylindrical objects: piping, pressurizers, steam generators, reactors, exchangers, water pipes.

The measurement belt according to the invention offers the advantage of being able to install a large number of temperature sensors very rapidly around an object OBJ, which is particularly attractive in the case where this object OBJ is situated in a constraining environment, such as for example in the containment building of a nuclear reactor subjected to ionizing radiation, for which the operators must intervene over the shortest possible duration to be subjected as little as possible to this radiation. The invention also allows installing with great reliability a large number of temperature sensors in these constraining environments.

The invention allows contacting the temperature sensor(s) directly with the object OBJ, which allows optimizing the temperature measurement accuracy and reducing their response times.

The invention claimed is:

1. A belt for measuring temperature of an object, the belt comprising:
   at least one measurement sensor,
   a strip having a circumference intended to surround the object,
   a device for clamping the strip around the object,
   characterized in thatwherein the temperature sensor is mounted on an individual heat-insulating support, displaceable in a guiding direction toward the object between at least two heat-insulating pads which are intended to abut against the object from a first high position, in which the sensor is at a non-zero distance from the object along the guiding direction, to a second low position, in which the sensor is applied against the object, the pads being attached to the strip.

2. The belt according to claim 1, wherein for an object with a curved and convex outer surface, which has to be surrounded by the circumference of the strip, the guiding direction is radial.

3. The belt according to claim 1, wherein the temperature sensor comprises a portion for application against the object, disposed on an inner surface of the support, intended to be turned toward the object.

4. The belt according to claim 1, wherein the pads are attached to an inner surface of the strip.

5. The belt according to claim 1, wherein it comprises a device for lifting the support, wherein the device for lifting the support is capable of occupying the first high position and is capable of passing to the second low position, the support being constrained to move along the guiding direction toward the object from the first position to the second position by a constraining device mounted between the support and the strip, the lifting device being actuable from the outside to cause the sensor to pass from the first position to the second position.

6. The belt according to claim 5, wherein the lifting device of the support comprises an upper plate, attached to the support by at least one rod (82) passing through the strip, the plate being outside the strip.

7. The belt according to claim 6, wherein the lifting device of the support comprises a holding member to hold the support in the first high position, wherein the holding member is removably attached to the upper plate to allow, when the holding member is removed from the plate, to cause the sensor to pass from the first high position to the second low position.

8. The belt according to claim 7, wherein the holding member comprises a wire, which passes in a guide attached to the plate to hold the support in the first high position and which comprises at least one gripping section situated outside the plate to allow the wire to be removed from the guide to cause the sensor to pass from the first high position to the second low position.

9. The belt according to claim 8, wherein the guide comprises at least two pulleys, which are rotatably mounted with respect to the plate and between which the wire is guided.

10. The belt according to claim 1, wherein the temperature sensor comprises a thermocouple.

11. The belt according to claim 1, wherein a plurality of temperature sensors distributed along the circumference of the strip is provided as a temperature sensor, the plurality of temperature sensors being associated with a plurality of individual heat-insulating supports of these temperature sensors, the supports each being guided in a guiding direction toward the object between heat-insulating pads attached to the strip.

12. The belt according to claim 11, wherein the lifting device of the support comprises a holding member to hold the support in the first high position, wherein the holding member is removably attached to the upper plate to allow, when the holding member is removed from the plate, to cause the sensor to pass from the first high position to the second low position,
   wherein the holding members, associated respectively with the individual supports, are mutually integral.

13. The belt according to claim 1, wherein the support is constrained to move along the guiding direction toward the object by a constraining device mounted between the support and the strip.

14. The belt according to claim 13, wherein the constraining device comprises at least one spring mounted between the support and the strip to constrain the support to move in the guiding direction toward the object.

* * * * *